Patented Dec. 5, 1922.

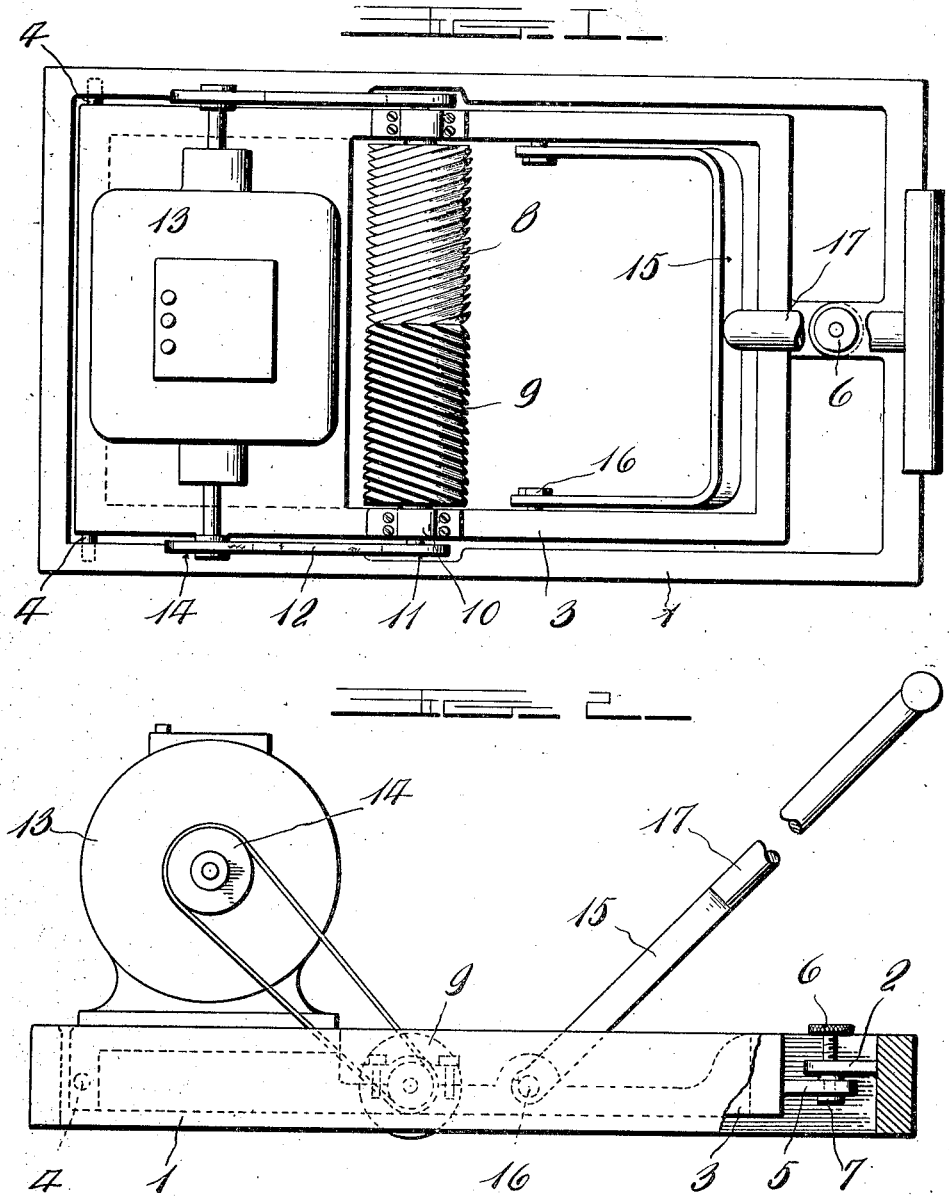

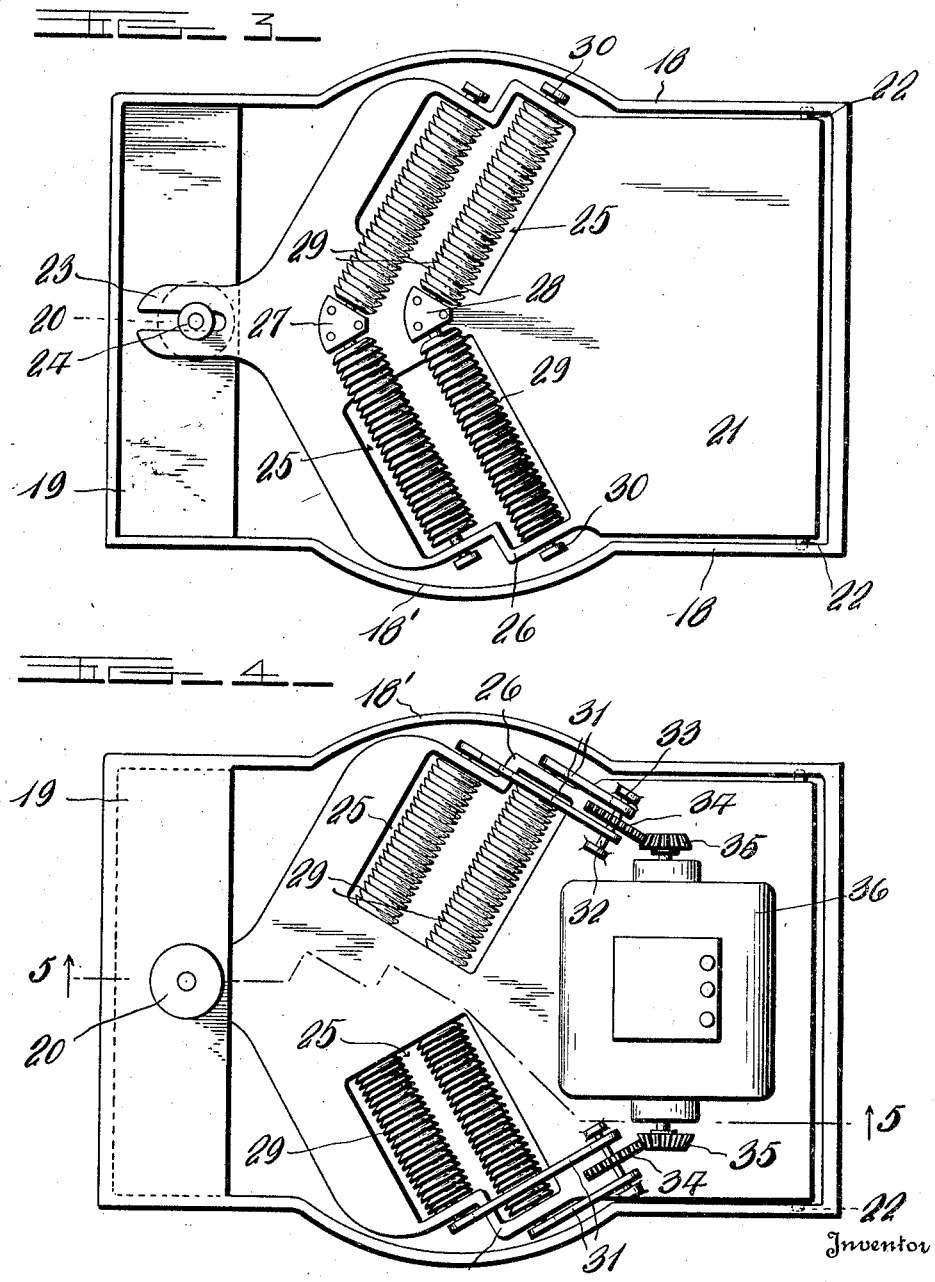

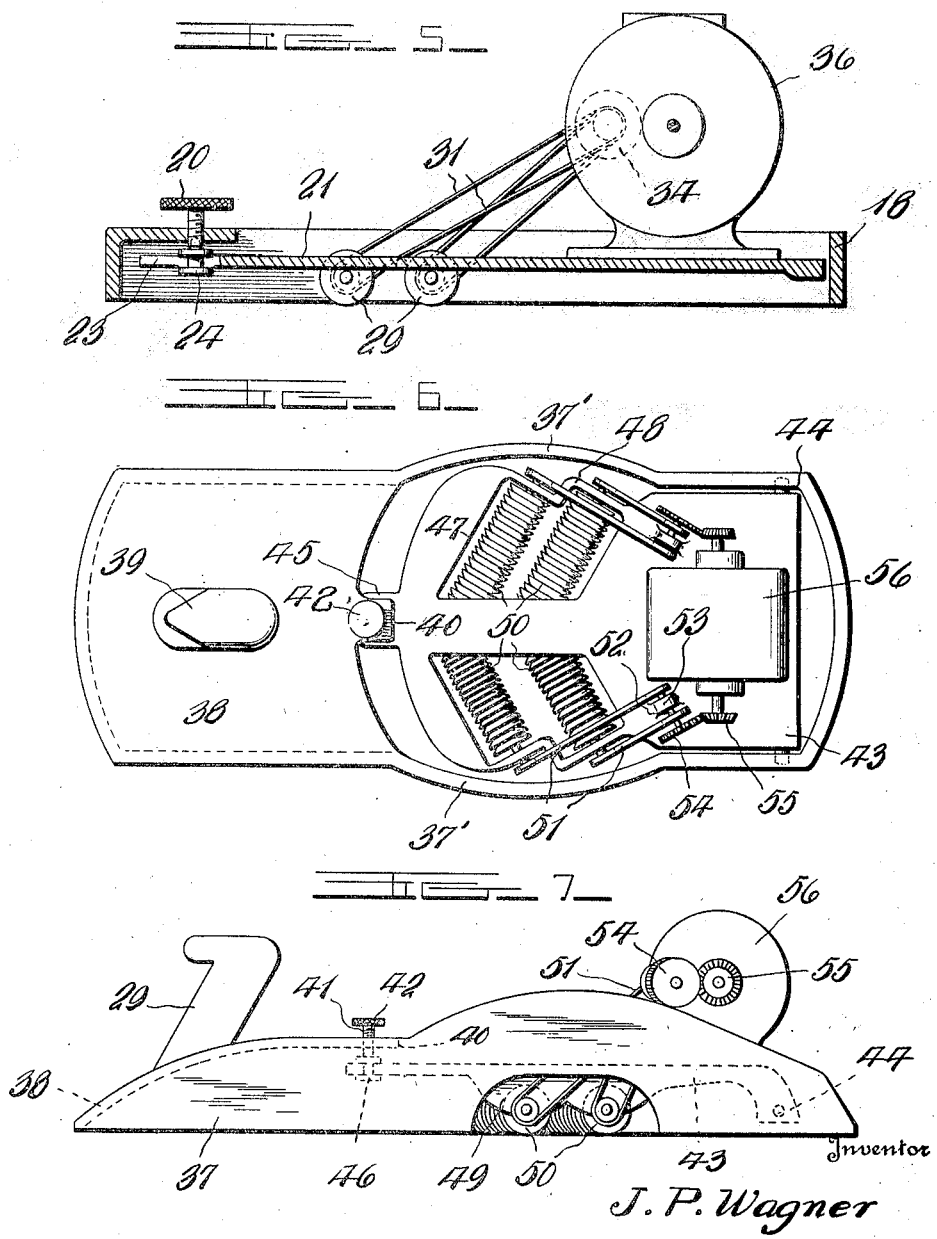

1,437,925

UNITED STATES PATENT OFFICE.

JAMES P. WAGNER, OF SELBY, SOUTH DAKOTA.

SURFACING DEVICE.

Application filed April 26, 1922. Serial No. 556,801.

*To all whom it may concern:*

Be it known that I, JAMES P. WAGNER, a citizen of the United States of America, residing at Selby, in the county of Walworth and State of South Dakota, have invented certain new and useful Improvements in Surfacing Devices; and I do hereby declare that the following is a full, clear, concise, and exact description of the invention, such as will enable others skilled in the art to which it appertains to make and use the same.

This invention relates to improvements in planing or surfacing devices having for an object to provide a device employing novelly formed and arranged rotatable cutting members, which, with movement of the supporting or main frame of the device over a surface to be treated, will evenly engage and cut or move the same throughout their respective lengths.

It is likewise an object of the invention to provide a vertically adjustable frame capable of being minutely adjusted with relation to the main frame to that degree required for effecting the surfacing operation to the desired nicety, this secondary frame, subsequently to adjustment, being rigidly secured with relation to the main frame in order that the forming of a cut of uniform depth will be ensured.

Other objects will be in part obvious and in part pointed out hereinafter.

In order that the invention and its mode of operation may be readily understood by persons skilled in the art, I have in the accompanying illustrative drawings and in the detailed following description based thereon set out several embodiments of the same.

In these drawings:

Figure 1 is a top plan view of one form of the improved surfacing device;

Figure 2 is a side elevation thereof having parts broken away and certain of the same shown in section;

Figure 3 is a bottom plan view of a slightly modified form of the device;

Figure 4 is a top plan view thereof;

Figure 5 is a vertical longitudinal section taken on the line 5—5 of Figure 4 looking in the direction in which the arrows point;

Figure 6 is a top plan view of a still further modified form of the invention; and, Figure 7 is a side elevation of the same.

Having more particular reference to the drawings, in connection with which like characters of reference will designate corresponding parts throughout, the improved device may be stated to comprehend a substantially rectangular main frame 1 having a laterally and inwardly disposed apertured lug 2 arranged upon the inner side of the forward end thereof as clearly shown in the Figure 2. Received in the main frame 1 is a secondary frame 3, also substantially rectangular in shape and having pivot pins 4 extending laterally from one end thereof, as indicated in the Figure 1, the remaining or forward end of said secondary frame extending into proximity to the forward end of the main frame and having a laterally extending lug 5 arranged upon the outer side of the forward end and correspondingly located with respect to the lug 2, whereby swivel connection with a vertically disposed adjusting screw 6 passing through the screw threaded opening or aperture in the lug 2 may be effected, as at 7; the head or upper end of the screw 6, obviously, being formed and arranged to facilitate ready engagement therewith.

Because of the connection between the forward ends of the main and secondary frames 1 and 3 through the medium of the lugs 2 and 5 and the adjusting screw 6 swivelly connected as at 7 to the lug 5, it will be understood that with rotation of said adjusting screw 6, vertical movement of the free portion of the secondary frame 3 with relation to the main frame 1 may be effected. This adjustment may be minutely made in order that functioning of the cutting means, hereinafter more fully described, will be effected to the desired nicety, dependent, of course, upon the degree of fineness of the screw threads upon such adjusting screw.

As means for cutting or treating a surface over which the device is moved, I provide a cylindrical cutting element having oppositely disposed or extending sets of spiral cutting edges 8 and 9 formed about its peripheral surface, such sets of spiral cutting edges extending outwardly in opposite directions from the intermediate portions of the cylindrical cutter as clearly shown in the Figure 1. Hence, it will be understood that when these several sets of cutting edges are engaged adjacent the surface to be treated, they will effectually cut or plane the same and at the same time, will serve to direct particles of matter removed during the treating operation, since by reason of the outward disposition of the spiral cutting edges, said particles will be moved outwardly in opposite directions from the opposite sides of the main frame 1.

The cylindrical member is provided upon its opposite ends with centrally located stub-shafts, which in turn are rotatably mounted in bearings 10 arranged upon the opposite sides of the secondary frame 1 at a point adjacent the inner side of the rearward end thereof, carrying sprockets, discs or similar gears 11 upon those ends of the same outwardly of the outer faces of the opposite sides of the secondary frame in order that sprocket chains, belts, or similar power transmission gearing 12 may be engaged therewith and thereby transmit rotary motion to the cutting member from the rotatable armatured shaft of an electrical motor 13 mounted upon the widened rear end portion of the secondary frame 3, and carrying gears 14, corresponding to the gears 11 upon their outer ends as clearly shown in the Figures 1 and 2, whereby the opposite ends of the power transmission gearing 12 may be engaged therewith.

The speed of the motor 13, of course, will be regulated to effect rotation of the rotatable cutting member at the desired velocity, in order that the spiral cutting edges 8 and 9 thereof will be effectually engaged with a surface to be treated.

To facilitate moving of the device over a surface, a bail or substantially U-shaped bracket 15 is provided and has the opposite ends thereof pivotally connected to the forward portions of the opposite sides of the secondary frame as indicated at 16; a handle 17 of suitable design, being arranged upon the intermediate portion of the bail 15, for an obvious purpose.

From the foregoing, it will be understood that when the secondary frame 3 has been adjusted to the desired position with respect to the main frame 1 through the medium of the adjusting screw 6 and the lugs 2 and 5, the device is placed or arranged upon the surface to be treated, permitting the lower portions of the rotatable cutting member to engage the same. The motor 13 is now energized, thus effecting the transmission of rotary motion through the gearing 14, 12 and 11 to the rotary cutting member, whereby the oppositely disposed spiral cutting edges 8 thereof will have cutting engagement with the surface engaged thereby and over which the same is moved. The depth of the cut made by the rotatable cutting member through the cutting edges 8 and 9, as hereinbefore stated, may be regulated through the adjusting screw 6.

In the Figures 3 and 4, I have shown a slightly modified form of the invention, the same comprehending a main frame 18 having outwardly curved or bulged portions 18' formed in the opposite sides thereof, while a transversely disposed web or shelf 19 is arranged or formed upon the forward end portions thereof as shown in the Figure 4, whereby, to permit the engagement of a vertically disposed adjusting screw 20 therein.

A secondary frame 21 is received in the main frame 18 and carries pivot pins 22 upon the opposite sides of the rear end portion thereof, which pins are pivotally engaged with adjacent portions of the rear end of the main frame, thus mounting said secondary frame for vertical pivotal movement with respect to the main frame 18. The forward or free end of the secondary frame 21 is reduced and provided with a bifurcated longitudinally disposed lug 23, arranged to correspond with the positioning of the adjusting screw 20 in order that the same may be swivelly or rotatably engaged in its bifurcated portion as at 24. By reason of the connection of the adjusting screw 20 with the bifurcated extension 23, it will be understood that with rotation of said screw, vertical adjustment of the forward or free portion of the secondary frame may be effected.

Openings 25 are formed in the forward portion of the secondary frame and are arranged in substantially U-shaped formation and as will be noted, have their outer side walls irregularly formed by reason of the off-setting or stepping of the adjacent portions of the secondary frame 21 as indicated at 26.

Brackets 27 and 28 are securely connected to the under sides of the forward portion of the secondary frame 21 between the inner ends of the openings 25 and as will be noted, are formed in their opposite angularly disposed sides with bearing pockets aligning with bearing openings formed in the stepped sides 26 of said secondary frame.

With a view towards providing cutters for treating or planing the surface over which the device is moved, I provide a plurality of cylindrical members having their peripheral surfaces formed to present a plurality of juxtaposed circumferentially extending cutting edges, as indicated at 29, arranging stub-shafts upon the opposite ends of these cutting members and rotatably mounting the same in the various pairs of oppositely disposed bearings formed in the stepped sides 26 of the secondary frame 21 and the angular faces of the brackets 27 and 28. Thus, it will be noted that a pair of the cutting members 29 are disposed longitudinally of the openings 25 in the main frame 21 and furthermore, that because of their respective mountings, that the outer ends of the rearwardly disposed cutting members will overlap the corresponding ends of the forwardly disposed cutting members, thereby ensuring an even and smooth cut or planing operation. Gears generally indicated by the reference numeral 30 are mounted upon the free ends of the stub shafts on the outer ends of the cylindrical cutting member 29 and as will be noted, are positioned adjacent the outer sides of the stepped portions 26 of the secondary frame, thereby permitting the engagement of belts or similar gearing 31 about the same, which in turn, is extended into engagement with gears mounted upon shafts 32 disposed in bearings 33 arranged upon the outer side of the rearward portion of the main frame 21 and carrying intermediately disposed gears 34 which mesh with bevelled gears 35 fixedly mounted upon the opposite end of the rotatable armature shaft of a motor 36 also positioned upon and secured to the upper side of the rearward portion of said secondary frame 21. In this way, rotary motion may be transmitted from the motor 36 to the several pairs of rotatable cutting members 29, causing the same to be collectively rotated, as they are moved over a surface to be treated.

Due to the angular positioning of the rotatable cutting members 29 in their substantially V-shaped formation, it will be understood that the circumferentially disposed cutting edges thereon will engage the surface to be treated in a manner such as will cause said cutting edges to bite into the surface and with continued rotation, to effect a smooth and even cut in the same of uniform depth throughout, this latter phase, of course, being controlled by the adjustment of the free end of the secondary frame 21 with respect to the main frame 18 through the medium of the adjusting screw 20. Likewise, because of the V-shaped positioning or arrangement of the cutting members 29, particles removed from the surface treated by the device will be deflected laterally in opposite directions to points beyond the opposite sides of the main frame 18.

The outwardly curving or bulging of the portions 18' of the main frame 18, as will be understood, permit of the arrangement of the stepped sides 26 of the forward portion of the secondary frame 21 in such main frame.

Yet another form of the invention is shown in the Figures 6 and 7, presenting herein, a hand tool corresponding to the ordinary carpenter's plane, consisting of a main frame 37 having a web portion 38 arranged over the forward end portion thereof and provided with a handle member 39, the rearward or remaining portion of said frame being open and provided with outwardly curved or bulged sides 37'. An inwardly disposed apertured extension 40 is formed upon the inner end of the web 38 and serves to receive therethrough a correspondingly threaded adjusting screw 41 having the knurled head 42 thereof positioned at a point whereat it may be conveniently engaged and adjusted by a user of the tool.

A secondary frame 43 is provided the device and has pivotal connection with the rearward end of the main frame 37 through the medium of pivot pins 44 extending from the opposite sides of the rearward end portion thereof into engagement with suitable bearing pockets formed upon the adjacent portions of the inner faces of the main frame sides.

The intermediate portion of the forward end of the secondary frame 43 is provided with a longitudinally disposed extension 45 having swivel connection, as at 46, with the lower end of the vertically disposed adjusting screw 41, thus effecting connection as between the free end of the secondary frame and the forward end of the main frame 37 whereby, with adjustment of the set screw 41, vertical movement of the secondary frame 43 may be had.

Openings 47, arranged in substantially V-shaped fashion, are formed in the forward portion of the secondary frame 43, and as will be noted, the adjacent portions of the sides of said secondary frame are stepped as at 48 and provided with downwardly disposed extensions 49 having bearings therein for receiving certain of the ends of the rotatable cutting means, to be presently described. Correspondingly arranged bearing brackets are arranged upon that portion of the secondary frame 43 intermediate the openings 47 and afford seats for the opposite ends of said cutting members.

A plurality of pairs of V-shaped arranged cylindrical cutting members 50 are rotatably mounted in the various pairs of bearings afforded by the downwardly disposed extensions 49 and the brackets secured to that portion of the secondary frame 43 intermediate said openings 47 and as will be noted, are arranged at acute angles with respect to the opposite sides of the main frame 37. Gears are fixedly mounted upon the outer ends of certain of the stub-shafts of the cutting members 50 and are engaged by belt gearing 51 extending into engagement with similar gears fixedly mounted upon shafts 52 mounted in bearings 53 upon the upper side of the rearward portion of said secondary frame 43, said shafts 52 carrying gears 54 upon their outer ends, which, in turn, mesh with bevelled gears 55 fixedly mounted upon the opposite ends of the rotatable armature shaft of an electrical motor 56 also mounted upon the upper side of the rearward portion of said secondary frame 43 as clearly shown in the Figure 6. By reason of the connection of the motor 56 with the rotatable cutting member 50, it will be understood that rotary motion will be transmitted collectively thereto.

Each of the rotatable cutting members 50 is formed with juxtaposed circumferentially disposed cutting edges in a manner similar to the forming of the cutting edges upon the rotatable cutting members 29 and in consequence, it will be understood that because of the acute angular positioning of these cutting members with relation to the opposite sides of the main frame 37, they will have cutting engagement with a surface over which the device is moved and because of that, will effect even and smooth cuts in the same.

In those forms of the invention illustrated in the Figures 3 to 7 inclusive, it is to be understood that the depth of the cut made by their respective rotatable cutting members 29 and 50 may be accordingly regulated by vertical adjustment of the free portions of their respective secondary frames 21 and 43, such adjustment being effected through the medium of the adjusting screws 20 and 41. During use of the devices, the cutting members, are of course, rotated at the desired velocity by means of the connection of their respective motors 36 and 56 with the same. The cutting members when engaging a surface to be treated, will function to effect an even and smooth cut of uniform depth throughout, since, movement of the secondary frames with respect to their particular main frames, subsequent to adjustment through the medium of the adjusting screws will be positively prevented. It will be understood that the cuts made by the forwardly disposed cutting members will be followed by the remaining or rearwardly disposed cutting members and in consequence, that the cut so made thereby will be smooth and even throughout, since the engagement of the circumferentially disposed cutting edges will be staggered fashion and thus avoid any possibility of ribbing or grooving the cuts so made.

The devices comprehended by the invention may be advantageously used in wood working as floor scrapers or planers or as ordinary carpenter's planes. Furthermore, the devices, by slight modification may be readily employed as cutters or scrapers for various surfacing or resurfacing operations, amongst which may be mentioned, the removing or cutting of the upper crust from bodies of ice. Likewise, by slight modification, the invention may be employed as an effectual road surfacer and scraper for the treating or resurfacing of roadways.

Manifestly, the constructions shown are capable of considerable modification and such modification as is within the scope of my claims, I consider within the spirit of my invention.

I claim:

1. A surfacing machine comprising a main frame, a secondary frame pivoted at one end to an adjacent end of the main frame and received therein, means mounted on the forward end of said main frame connected to the corresponding end of the secondary frame for effecting vertical pivotal adjustment of the latter, and a plurality of pairs of cylindrical cutting members rotatably mounted on said secondary frame in substantially V-shaped formation, certain of the members being arranged parallel to each other and having circumferentially disposed juxtaposed cutting edges formed upon their peripheral surfaces.

2. A surfacing machine comprising a main frame, a secondary frame pivoted at one end to the adjacent end of said main frame, means to adjust the free end of the secondary frame with respect to the main frame, a plurality of pairs of cutters journalled on the secondary frame, the cutters of each pair being arranged in V-shaped formation and parallel to the cutters of the remaining pair, said cutters being provided with driving pulleys fixedly connected to the cutters, a motor on the secondary frame, jack shafts on said secondary frame driven by said motor, belt pulleys on said jack shafts alined with the pulleys on the cutters and belts connecting the jack shaft pulleys and the cutter pulleys.

3. A surfacing machine of the character described comprising a main frame consisting of side and end walls, said side walls being bulged outwardly, a secondary frame, means for adjustably connecting said secondary frame to said main frame, a cylindrical cutting element rotatably mounted on said secondary frame having a plurality of oppositely disposed file cutting edges formed upon the peripheral surface thereof, said cutting members being arranged at angles to the main frame, and said cutting elements adapted to extend within the bulged side walls of said main frame substantially as and for the purpose specified.

4. A surfacing machine of the character described comprising a main frame, a secondary frame adjustably connected to said main frame, a plurality of pairs of cylindrical cutting members, each pair being arranged in substantially V-shaped formation upon the secondary frame and having circumferentially disposed cutting edges formed upon their peripheral surfaces, motive means for driving said cutting members for collectively rotating the same, and adjusting means mounted on said main frame whereby the second frame may be manually adjusted with respect to the main frame.

In witness whereof I have hereunto set my hand.

JAMES P. WAGNER.